United States Patent [19]
Tran

[11] Patent Number: 6,108,217
[45] Date of Patent: Aug. 22, 2000

[54] BACKUP POWER CIRCUIT

[75] Inventor: Quang Tran, Mississauga, Canada

[73] Assignee: IVI Checkmate Ltd., Toronto, Canada

[21] Appl. No.: 09/420,500

[22] Filed: Oct. 19, 1999

[51] Int. Cl.[7] .............................. H02M 3/335; H02J 9/06
[52] U.S. Cl. ............................................... 363/20; 307/64
[58] Field of Search .................................. 363/16, 20, 21, 363/55, 56, 131; 307/64, 65, 66

[56] References Cited

U.S. PATENT DOCUMENTS

| | | | |
|---|---|---|---|
| 5,029,285 | 7/1991 | Bobry | 307/64 |
| 5,302,858 | 4/1994 | Folts | 307/66 |
| 5,414,611 | 5/1995 | Muto et al. | 363/21 |
| 5,790,391 | 8/1998 | Stich et al. | 363/24 |
| 5,798,633 | 8/1998 | Larsen et al. | 323/207 |
| 5,909,360 | 6/1999 | Lavin et al. | 363/21 |
| 5,982,645 | 11/1999 | Levran et al. | 363/37 |
| 5,982,652 | 11/1999 | Simonelli et al. | 363/142 |

*Primary Examiner*—Adolf Deneke Berhane

[57] ABSTRACT

A backup power circuit provides reserve power to a terminal device in the event of loss of power from the main power source. In the terminal device, the main power source is connected to a power circuit which generates two different voltage signals used by different circuits therein. The backup power circuit selectively stores energy from the higher voltage signal and supplies the stored energy to the power circuit when the main power fails, thereby allowing the power circuit to generate the lower voltage signal.

9 Claims, 4 Drawing Sheets

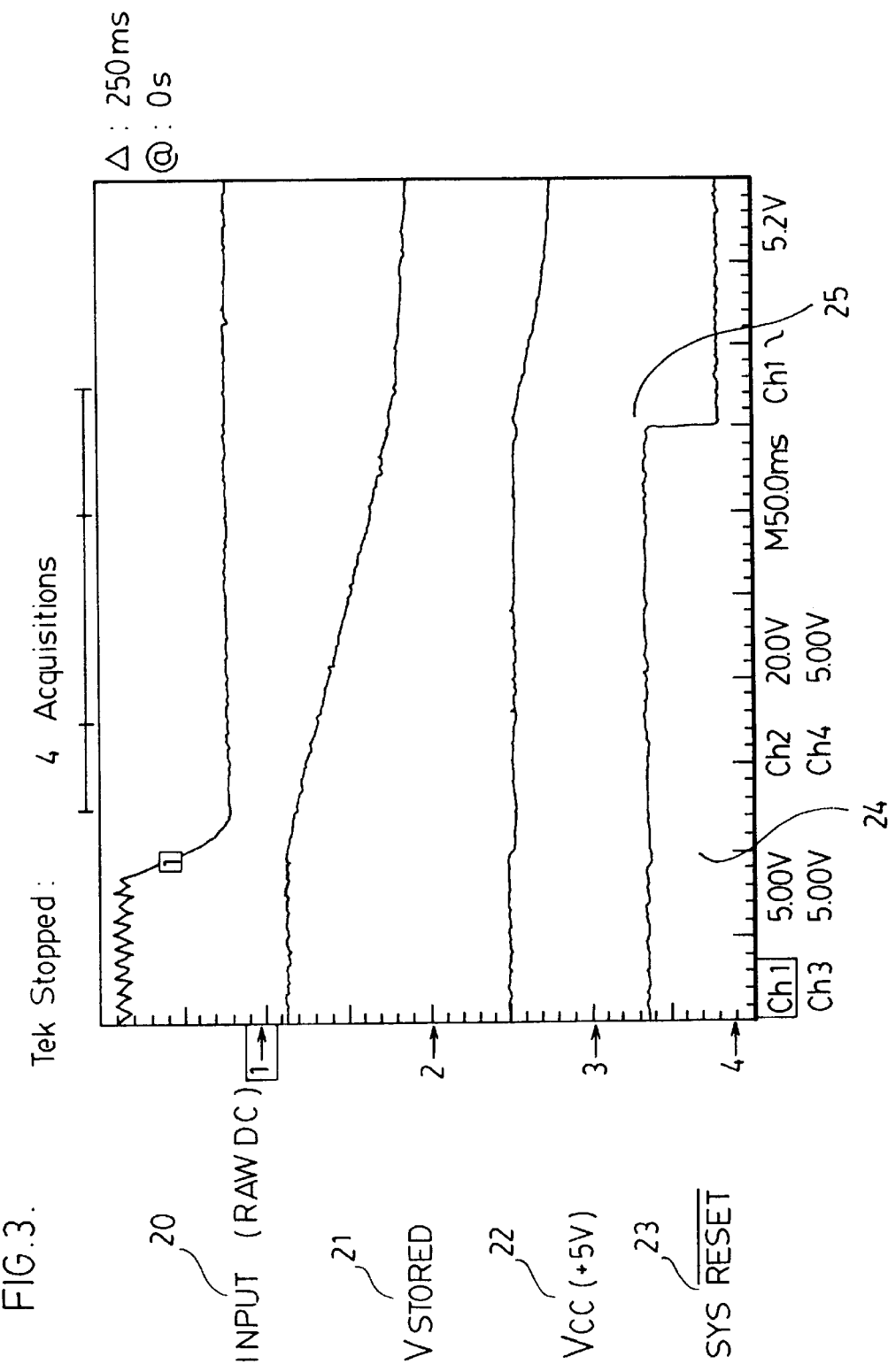

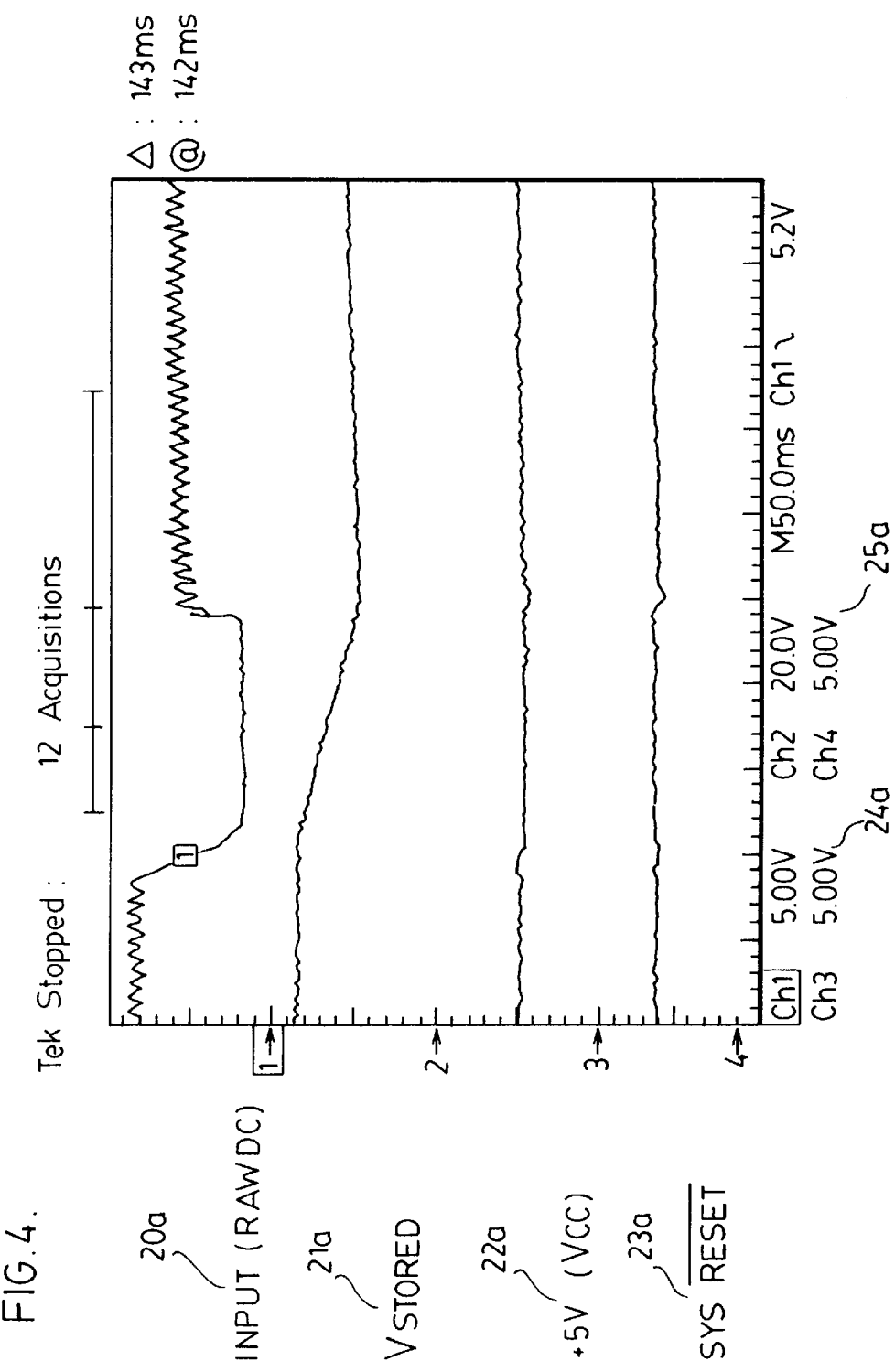

BACKUP POWER CIRCUIT

FIELD OF THE INVENTION

The invention relates to a backup power circuit providing temporary power to circuits in an electronic communications terminal device when the main power signal is lost.

BACKGROUND OF THE INVENTION

Terminal devices are located at remote sites and exchange data with a central computer system. Common examples of such devices include Point-of-Sale (POS) terminals, electronic fund transfer (EFT) devices, electronic banking machines and digital communications equipment (DCEs).

Terminal devices are generally powered by electricity provided at the remote site generated by a power adapter. If power is interrupted while the device is performing a critical task, such as modifying data or transferring data to other equipment, the validity and reliability of the task is compromised.

As such, terminal devices typically have built-in backup power circuits providing temporary reserve power to the essential circuits in the device when main power is lost. The temporary power enables the devices to complete at least the critical processes before all power is lost. Conventional methods for supplying temporary power use circuits having large voltage supplies and capacitance devices located at the power input side of the terminal device. These circuits require expensive voltage supplies and capacitors.

SUMMARY OF THE INVENTION

The present invention provides a backup power circuit for a terminal device, such as a POS terminal, EFT or DCE. Generally, the terminal device has at least a main functional circuit operating at a first voltage, a second functional circuit operating at a second higher voltage and a power circuit which provides at least the two voltages. The main functional circuit contains the main control electronics for the terminal. The second functional circuit provides the display electronics for the terminal. The power circuit transforms an input voltage from an input power source to provide the two voltages for the functional circuits.

The backup power circuit is connected to the second voltage and has an energy storage device to store energy from the second voltage and a discharge circuit connected to the power circuit. The backup power circuit stores energy from the second voltage when the input voltage source is producing enough voltage for the main functional circuit to operate; the backup power circuit discharges the stored energy to the power circuit through the discharge circuit when the main functional circuit is not being provided with sufficient voltage to operate.

It is an aspect of the invention to provide a backup power circuit supplying temporary power to a terminal device. It is a further aspect of the invention to detect when the main power to the device is lost and then to provide a backup power automatically.

It is a further aspect of the invention to provide a backup power in an economical manner.

BRIEF DESCRIPTION OF THE DRAWINGS

Preferred embodiments of the invention are shown in the drawings, wherein:

FIG. 3 shows a voltage vs. time graph of a terminal device with a backup power circuit operating in a loss-of-power situation; and FIG. 4 shows a voltage vs. time graph of a terminal device with a backup power circuit operating in a "brown-out" situation.

DETAILED DESCRIPTION OF THE PREFERRED EMBODIMENTS

Figure 1:
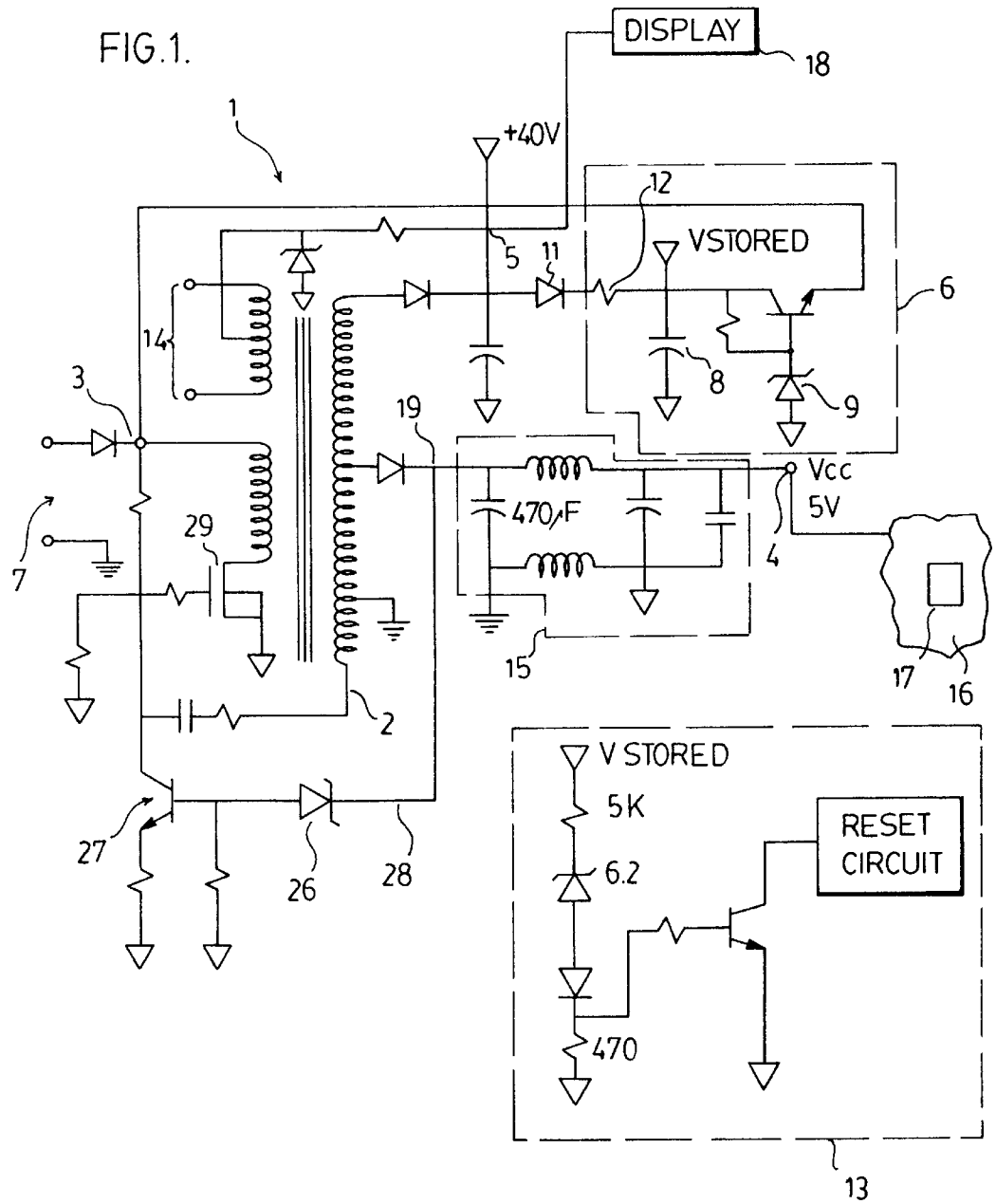
FIG. 1 is a circuit diagram showing a power supply circuit of a terminal device with the backup power circuit feeding into the power circuit of the device.

Referring to FIG. 1, a feedback electrical circuit for a terminal device embodying the invention is shown. Power circuit 1 operates in the following manner. A DC power adapter (typically 9 Volts DC at 650 mA) provides an input DC voltage at node 7. Transformer 2 receives the input voltage at node 3. Two output voltage taps are provided; the first produces 5 volts at node 19 and the second produces 40 volts at node 5. The voltage at node 19 is conditioned by LC circuit 15 to produce the 5 volt supply at node 4. The voltage is regulated by the feedback path comprising connection 28, diode 26 and transistor 27, which control the switching frequency of transistor 29. The 5 volt supply provides power for the main functional circuit 16 of the terminal device, including microprocessor 17; the 40 volt supply provides the power for the second functional circuit of the terminal device, including display electronics 18. AC voltage tap 14 provides the display filament in display electronics 18 with power. Backup power circuit 6 provides the backup voltage for the circuit, consuming less than 10 watts of power.

It can be appreciated that the terminal device and the circuits therein can be designed to operate at other voltages. Typically, the input voltage is between 9 and 12 volts at 500 to 1000 mA; the typical voltage required for the electronics connected to node 4 is between 3 to 5 volts; the voltage required for the driver of the display is between 30 and 40 volts, and the voltage for the display filament is 4.5 volts rms.

In the circuit of FIG. 1, backup power circuit 6 takes power from the 40 volt supply at node 5. By taking power from the highest available voltage in the circuit, the storage power of the backup power circuit is maximized. When backup power circuit 6 is activated, the backup output voltage is fed back to node 3, the input of transformer 2.

The main components of backup power circuit 6 are capacitor 8, diode 9 and transistor 10. Capacitor 8 stores energy from the 40 volt power supply and provides the backup energy for electrical circuit 1; in this embodiment, it has a nominal capacitance of 4400 $\mu$F. Transistor 10 acts as a current source that provides the discharge of energy stored in the capacitor. Diode 9 provides the voltage regulation of the back up power at the emitter of transistor 10. It can be appreciated that different component value can be utilized for capacitor 8, diode 9 and transistor 10 to effect different voltage, transient response, timing or storage characteristics of the backup power. It can further be appreciated that the output from backup circuit 6 may be fed to an intermediary circuit which is, in turn, connected to node 3.

Backup circuit 6 operates in two modes: a charging mode and a discharging mode. In the charging mode, circuit 1 is operating under sufficient power supply conditions. Diode 11 rectifies the voltage received from node 5 and prevents any reverse flow of energy through it. Resistor 12 limits the current flowing to the backup circuit. Capacitor 8 stores the voltage passed through resistor 12. The discharge path for the energy stored in capacitor 8 is connected to the input tap of transformer 2 at node 3. However, in order to capacitor 8 to maintain its charge, it is necessary to break the discharge path circuit. As such, transistor 10 cannot be conducting. In this operating mode, there are 5 volts at node 4 and 40 volts at node 5, approximately 7.8 volts at node 3 and 7.2 volts at the cathode of diode 9. As such, the base-emitter junction of transistor 10 is reversed biased.

When there is a power failure, the voltage at node 3 drops from the originally supplied 9 volts. Output power at node 3 can disappear within 1 to 3 ms of the loss of the input power source. The backup circuit detects the loss of power and switches to discharging mode.

In discharging mode, the discharge circuit path connected to capacitor 8 must be completed. This occurs when the base-emitter junction of transistor 10 becomes forward biased. In circuit 10, the voltage at node 3 must drop to approximately 6.6 volts to forward bias transistor 10. Afterwards, capacitor 8 discharges through transistor 10 to node 3. In turn, the voltage produced by backup circuit 6 provides output voltage to nodes 4 and 5, which, in turn, power main electronics 16 and display electronics 18.

As capacitor 8 discharges, its stored voltage drops from its initial 40 volt charge. The voltage is conditioned by zener diode 9 and transistor 10 to provide node 3 with a regulated voltage of 6.6 volts. The capacitance of capacitor 8 has been selected to provide approximately 200 ms of backup power. It can be appreciated that modifications may be made to backup circuit 6 to vary the amount of backup power provided. If shorter backup times are sufficient, then smaller and less expensive capacitors can be used. If longer backup times are required, larger capacitors may be used.

As the amount of backup power is limited, when a failure of the main power supply occurs, main electronics 17 must recognize the power failure and perform emergency power-loss shutdown routines within at least the 200 ms backup power window. Such routines may include completing pending transactions and communications and saving system state to non-volatile memory or reset the system.

Reset circuit 13 detects when the voltage stored in capacitor 8 to falls below a predetermined value. Afterwards, after a preset time window, a reset signal is activated, to reset microprocessor 17. In this circuit, the reset signal is generated 250 ms after the initial loss of power.

When power is restored, the 9 volt power supply once again produces sufficient voltage to provide the required voltages at nodes 4 and 5. As the voltage rises above 6.6 volts at node 3, transistor 10 will become reversed biased, thereby breaking the discharge path circuit between backup circuit 6 and node 3. At that time, the voltage at node 5 can recharge capacitor 8.

FIG. 3 shows a voltage-time graph of voltages at selected nodes in the circuit in FIG. 1 when main power is lost. Graph 20 represents the voltage supplied by a DC power supply. Graph 21 represents the voltage stored in capacitor 8. Graph 22 represents the voltage at node 4; graph 23 represents the reset signal. At time 24, the circuit has been operating for at least 50 ms; Graph 22 shows 5 volts; graph 21 shows approximately 36 volts. In this example, immediately before time 24, power from the voltage supply is lost. Around time 24, graph 20 shows a decline in the voltage provided by the voltage supply. The decline in the voltage activates backup circuit 6, thereby causing capacitor 8 to provide backup power to the circuit. Graph 21 shows that after time 24, the voltage in capacitor 8 decays. Note that the power supplied by backup circuit 6 allows transformer to maintain 5 volts at node 4 for more than 200 ms, indicated by the relatively stable signal shown in graph 22. Referring to graph 25, 250 ms after the loss of power from the voltage supply, the reset signal is activated.

FIG. 4 shows another voltage-time graph of voltages at nodes in the circuit shown in FIG. 1 in a power "brown-out" condition. The nodes represented in FIG. 3 are also represented in FIG. 4; reference numbers in FIG. 4 share those with FIG. 3, but with an "a" suffix. In FIG. 4 at time 24*a*, the circuit has been operating for at least 50 ms; Graph 22*a* shows 5 volts on node 4; graph 21*a* shows capacitor 8 charged to approximately 36 volts. Just before time 24*a*, power from the voltage supply is lost.

Here, a "brown-out" lasts for 143 ms. Full power is lost just before point 24*a* and power is restored at point 25*a*. During the "brown-out", energy stored in capacitor 8 provides backup power to the circuit. At point 21*a*, voltage at capacitor 8 is 36 volts. This decays to 22 volts by point 25*a*. When input power is restored at point 25*a*, capacitor 8 stops discharging and recharges to 36 volts. Throughout the entire timespan, graph 22*a* shows that node 4 always provides 5 volts to the electronics circuits. Graph 23*a* indicates that the system reset signal is not initiated.

Figure 2:
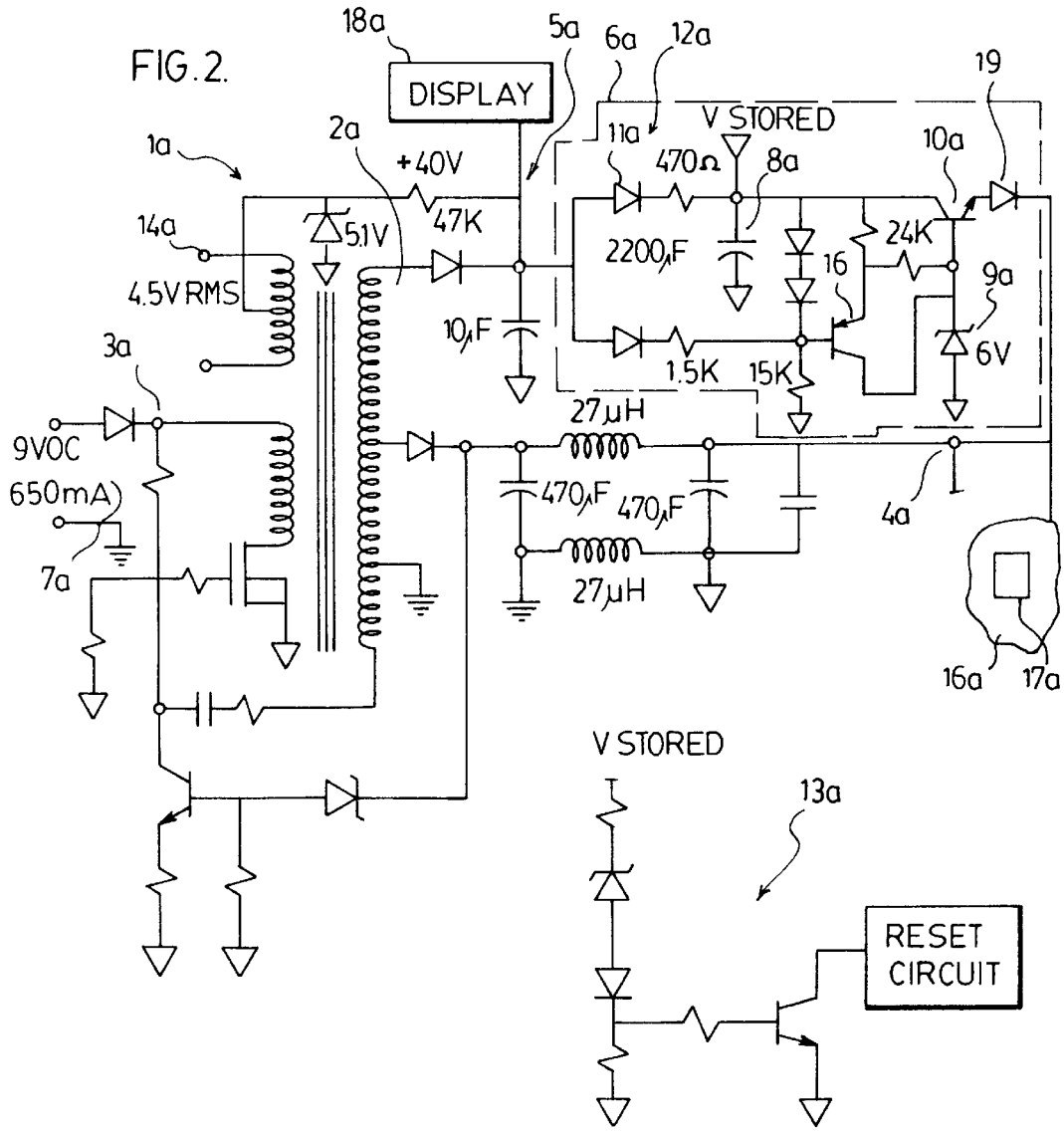
FIG. 2 is a circuit diagram showing a power supply circuit of a terminal device with a backup power circuit feeding into the main electronics circuit of the device.

FIG. 2 shows another embodiment of the invention wherein the backup circuit provides a fed forward voltage connected directly to the main electronics power rail. Where appropriate, reference numbers for similar components found in FIG. 1 and FIG. 2 have been repeated. Such references in FIG. 2 have an additional suffix "a" attached.

In FIG. 2, power circuit 1*a* operates in the following manner. A DC power adapter provides a DC voltage at node 7*a*. Transformer 2*a* provides a 5 volt supply at node 4*a* and a 40 volt supply at node 5*a*. The 5 volt supply provides power for main electronics 16*a*, including microprocessor 17*a*; the 40 volt supply provides the power for the display electronics 18*a* associated with the terminal device. Backup power circuit 6*a* provides the backup voltage for the circuit.

Backup power circuit 6*a* takes power from the 40 volt rail at node 5*a*. When backup power circuit 6*a* is activated, the output voltage is fed forward to node 4*a*.

The main components of backup power circuit 6*a* are capacitor 8*a*, diode 9*a* and transistor 10*a*. Capacitor 8*a* stores energy from node 5*a* to provide backup energy for electrical circuit 1*a*; in this embodiment, it has a nominal capacitance of 2200 μF. As the feed forward circuit is supplying power directly to node 4*a*, the size of capacitor 8*a* is smaller than capacitor 8 in FIG. 1. Transistor 10*a* acts as a switch controlling the discharge of voltage from capacitor 8*a*. Zener diode 9*a* provides voltage regulation while transistor 10*a* acts as a current source for backup circuit 6*a*. Again, different component value can be utilized for capacitor 8*a*, diode 9*a* and transistor 10 to effect different response characteristics. It can further be appreciated that the output from backup circuit 6*a* may be fed to an intermediary circuit which is, in turn, connected to node 4*a*.

Again, backup circuit 6*a* operates in two modes: a charging mode and a discharging mode. In the charging mode, the voltage from node 5*a* charges capacitor 8*a*. Diode 11*a* rectifies the voltage of node 5*a* and blocks discharge of any energy stored in capacitor 8*a* to node 5*a*. Resistor 12*a* limits the current flowing to the capacitor 8*a*.

In the charging mode, it is necessary to break the discharge path circuit for the charge stored in capacitor 8*a*. As such, transistor 10*a* cannot be conducting. In this example, zener diode 9*a* clamps the voltage at the base of transistor 10*a* to 6.0 volts. As long as the voltage supply is operating to produce 5 volts at node 4a, the voltage at the emitter of transistor 10a would be approximately 5.6 volts, due to diode 19. In this situation, the emitter base junction of transistor 10a remains reverse biased.

In discharging mode, the discharge path from capacitor 8a must be completed. After main power has been lost, the voltage at node 4a falls from 5 volts. Consequently, the voltage at the emitter of transistor 10a begins to fall. However, the voltage at the base of transistor 10a remains at 6 volts because of zener 9a. Transistor 10a becomes forward biased when the voltage at the emitter of transistor 10a falls below approximately 5.4 volts. Transistor 16 and double diodes at 17 provide a voltage drop of 0.5 volts across resistor 18. This regulated voltage drop provides a constant current source of approximately 2 mA to diode 9a. This provides improved voltage regulation during the discharge of the energy stored in capacitor 8. Thereafter, a discharge path is established from capacitor 8a to node 4a. As such, capacitor 8a can then provide a voltage to node 4a.

As capacitor 8a discharges, its stored voltage drops from its initial 40 volt charge. The voltage is conditioned by zener diode transistor 10a and diode 19 providing node 4a with a regulated voltage of 4.8 volts. The capacitance of capacitor 8a has been selected to provide approximately 200 ms of backup power. It can be appreciated that modifications may be made to backup circuit 6a to vary the amount of backup power provided.

When power is restored, the 9 volt power supply once again produces sufficient voltage to provide the required voltages at nodes 4a and 5a. At that point, transistor 10a becomes reverse biased, thereby breaking the discharge path circuit. At that time, capacitor 8a can recharge again.

Reset circuit 13a operates in a similar manner to reset circuit 13.

Although various preferred embodiments of the present invention have been described herein in detail, it can be appreciated that the present invention is not restricted to what is described above and shown in the drawings, but can be changed or modified in many different way within the scope of the invention defined in the attached claims.

The embodiments of the invention in which an exclusive right and privilege is claimed are defined as follows:

1. A backup power circuit for a terminal device, said terminal device having a main functional circuit operating at a first voltage, a second functional circuit operating at a second higher voltage and a power circuit comprising transformer means to transform an input voltage from an input source to said first and second higher voltages, said backup power circuit comprising capacitative means associated with said second higher voltage for storing energy from said second higher voltage and a discharge circuit for selectively causing said capacitative means to store said energy from said second higher voltage when said input voltage source is producing sufficient voltage for said main functional circuit or discharge said energy to a node at either an input tap on said transformer or said main functional circuit when said input is not producing said sufficient voltage for said main functional circuit.

2. The backup power circuit as claimed in claim 1 wherein said discharge circuit discharges said stored energy to an input of said transformer in response to voltage conditions at said input of said transformer.

3. The backup power circuit as claimed in claim 1 wherein said discharge circuit discharges said stored energy to said main functional circuit in response to voltage conditions at said main functional circuit.

4. The backup power circuit as claimed in claim 1 wherein said capacitative means comprises a capacitor of less than 6,000 μF.

5. The backup power circuit as claimed in claim 1 wherein said second output voltage is between approximately 20 to 60 volts.

6. The backup power circuit as claimed in claim 1 wherein said first output voltage is between approximately 2 to 5 volts.

7. The backup power circuit as claimed in claim 1 wherein said backup power circuit provides sufficient power to said first functional circuit for a minimum of 200 ms.

8. A backup power circuit for a terminal device, said terminal device having a main functional circuit operating at a first voltage, a display circuit operating at a second higher voltage and a power circuit comprising a transformer to convert an input voltage from an input voltage source to said first and second higher voltages, said backup power circuit comprising a capacitor associated with said second higher voltage for storing energy from said second higher voltage and a discharge circuit for selectively causing said capacitor to store said energy from said second higher voltage when said input voltage is sufficiently present or discharge said energy to an electrical node in said terminal device when said input voltage is not sufficiently present.

9. A backup power circuit for a terminal device, said terminal device having a main functional circuit operating at a first voltage between 2 and 5 volts, a display circuit operating at a second voltage between 25 and 40 volts and a power circuit comprising a transformer to convert an input voltage from an input voltage source to said first and second voltages, said backup power circuit comprising a capacitor associated with said second voltage for storing energy tapped from said second voltage and a discharge circuit for selectively causing said capacitor to store said energy from said second voltage when said input voltage source is producing a sufficient voltage for said main functional circuit or discharge said energy to a node at either an input tap on said transformer or said main functional circuit when said input voltage source is not producing said sufficient voltage for said main functional circuit.

\* \* \* \* \*